United States Patent [19]
Takaki et al.

[11] Patent Number: 6,151,129
[45] Date of Patent: Nov. 21, 2000

[54] IMAGE READING APPARATUS

[75] Inventors: Kosuke Takaki, Dazaifu; Takeshi Nakayama, Fukuoka, both of Japan

[73] Assignee: Matsushita Electric Industrial Co., Ltd., Osaka, Japan

[21] Appl. No.: 09/182,185

[22] Filed: Oct. 30, 1998

[30]     Foreign Application Priority Data

Oct. 31, 1997  [JP]  Japan ................................. 9-300130

[51] Int. Cl.[7] .................................................... H04N 1/36
[52] U.S. Cl. ............................................. 358/1.1; 358/486
[58] Field of Search ................... 358/474, 486, 358/496, 497, 1.1; 395/111

[56]          References Cited

U.S. PATENT DOCUMENTS

| 4,447,832 | 5/1984 | Kurata ........................................ 358/296 |
| 5,513,017 | 4/1996 | Knodt et al. ............................. 358/471 |
| 5,745,254 | 4/1998 | Satou ......................................... 358/412 |

FOREIGN PATENT DOCUMENTS

3-23463   3/1991   Japan .............................. B65H 43/00

*Primary Examiner*—Jerome Grant, II
*Attorney, Agent, or Firm*—Wenderoth, Lind & Ponack, L.L.P.

[57]                    ABSTRACT

In the case of handling an independent document, a transmission switch is set at "L" position and the document is transmitted and read out at a high speed, and the document is discharged to the front side of the image reading apparatus. In the case of handling a continuous document, the transmission switch is set at "H" position, and the document is transmitted at a low speed subjected to the processing capacity of an image processor, and the document is read out before being discharged to a rear face of the apparatus. At this time, when the document arrives at a given location in the apparatus, a table apparatus lowers the table and prevents the continuous documents from being damaged.

8 Claims, 10 Drawing Sheets

IMAGE READING APPARATUS

FIELD OF THE INVENTION

The present invention relates to an image reading apparatus that can handle both of the independent document and the continuous document.

BACKGROUND OF THE INVENTION

Recently, the electronic filing system has drawn attention in the market, which entails the increase of the needs for the image reading apparatus as an input device. The image reading apparatus is demanded to read documents at a highest possible speed in order to improve work efficiency. In general, the image reading apparatus employs the following process: documents stacked on a feeding table is sent out sheet by sheet, and the data thereof is read out by a fixed reader during high speed transmission. Machines such as KX-SS55N and KX-SS55EXN made by Matsushita Electric Industrial Co., Ltd. are the typical models employing the above process.

Conventional image reading apparatuses, however, were designed to handle independent documents supplied sequentially, and the conventional image reading apparatus thus cannot deal with continuous documents that are used in offices as output slips.

Information quantity depends on respective sheets of documents. In the case of handling the independent documents, a following sheet of the independent documents must be halted until a preceding sheet completes a read-out process and an image process. In the case of handling the continuous documents, sheets are continuously sent out and the conventional apparatus cannot deal with them because the sheets must be supplied at a speed corresponding to the process time of the maximum information quantity per sheet.

Recently the electronic filing systems prevail in the market, and the image reading apparatuses are used under various environments. This market trend demands an image reading apparatus to handle various types of documents, in particular, continuous documents.

SUMMARY OF THE INVENTION

The present invention aims to provide image reading apparatuses having the following constructions to address the above problem.

A first image reading apparatus of the present invention comprises the following elements:
(a) a table on which documents are placed;
(b) transmission means for transmitting the documents;
(c) reading means for reading images of the documents;
(d) control means for controlling the table, transmission means and reading means.

The control means transmits the document on the table with the transmission means, reads the image of the document with the reading means during this transmission, and switches processing speeds of the transmission means and reading means responsive to a type of the document.

A second image reading apparatus of the present invention further comprises the following element in addition to the first apparatus:
(e-1) image data processing means for processing the image data that has been read out by the reading means. When the continuous document is handled, the process speeds of the transmission means and the reading means are subjected to the process speed required by the image data processing means.

These two constructions enable the above respective image reading apparatus to handle both of the independent document and the continuous document.

A third image reading apparatus of the present invention additionally includes the following element to the first apparatus:
(e-2) table moving means for moving the table up and down. Before transmitting the continuous document with the transmission means, the control means elevates the table, on which the continuous documents are stacked, with the table moving means. The control means then lowers the table after the document arrives at a given location in the apparatus. This mechanism prevents the continuous documents from being damaged by the transmission means, because, in the case of handling the continuous documents, the table moving means elevates the table, and the documents start to be fed, then the table moving means lowers the table.

A fourth image reading apparatus of the present invention includes a document feeding means in the transmission means. The document feeding means takes a leading edge of the document into the apparatus. In the case of handling the continuous documents, the document feeding means stops its operation after a given length of the document is transmitted into the apparatus. This mechanism enables the documents to be fed smoothly.

A fifth image moving apparatus of the present invention has different transmission paths in the transmission means with regard to the independent documents and continuous documents. This mechanism realizes the respective discharging processes responsive to the types of documents.

DESCRIPTION OF THE PREFERRED EMBODIMENTS

An exemplary embodiment of the present invention is described hereinafter with reference to the accompanying drawings.

Figure 1:
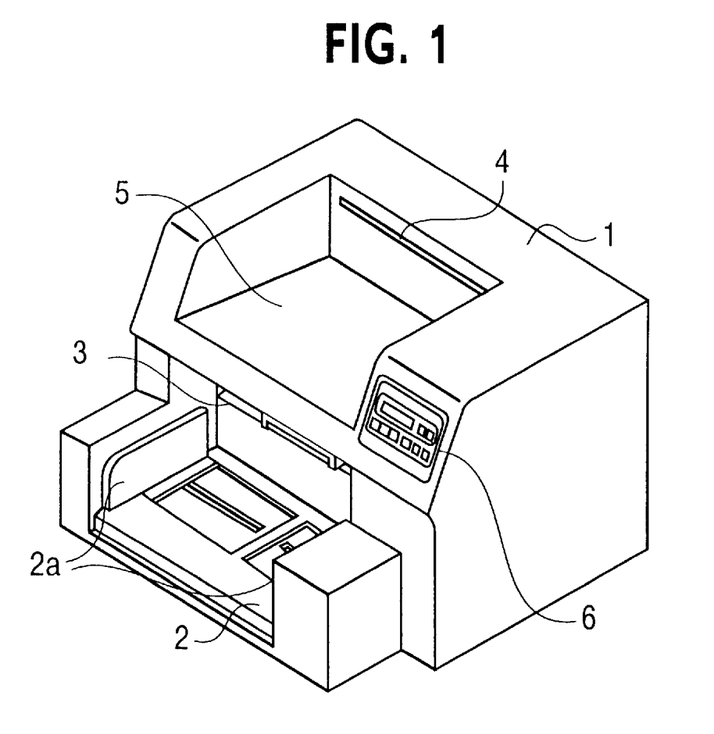
FIG. 1 is a perspective view of an image reading apparatus used in an exemplary embodiment of the present invention.
Figure 2:
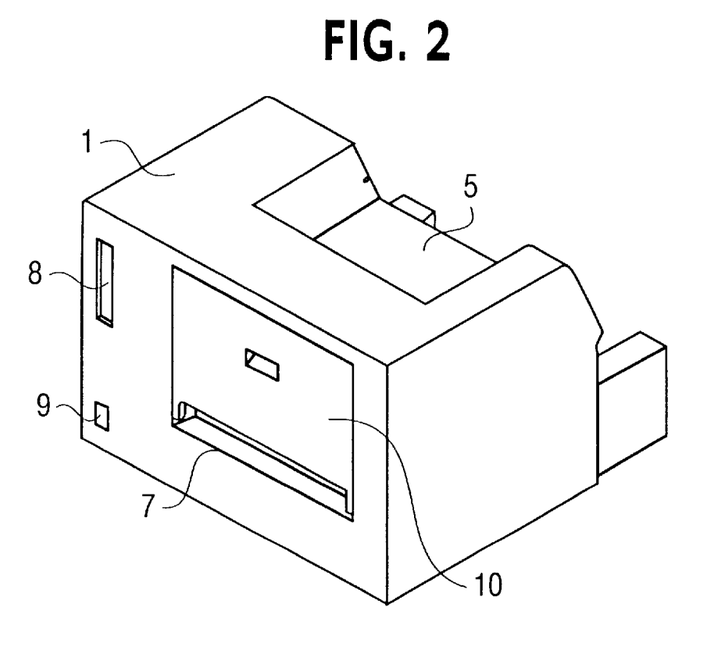
FIG. 2 is a perspective view taken from the rear side of the image reading apparatus.

FIG. 1 is a perspective view of an image reading apparatus used in the exemplary embodiment of the present invention. FIG. 2 is a perspective view taken from the rear side of the image reading apparatus.

A hopper table 2 is mounted movably up and down to the front face of the housing 1 of the image reading apparatus. Documents stacked on the hopper table 2 are sent out into the housing 1 through a document feeding slit 3. The document fed into the housing 1 is discharged from a document discharging slit 4, then stacked on a discharged document stacker 5. An input section 6 inputs commands or sets conditions to the image reading apparatus. The hopper table 2 can be raised or lowered by a motor and an elevating mechanism (not shown). A document guide 2a disposed on the upper face of hopper table 2 can be slid in a width direction of the document. Another document discharging slit 7 is provided on a rear face of housing 1. An interface 8 (hereinafter called I/F) couples this image reading apparatus with an outer host computer. A connector 9 receives a power cord, and a door 10 is opened for maintenance work inside the housing 1.

The image reading apparatus used in this embodiment switches a transmission path inside the housing 1 responsive to a thickness or a type of the document fed from the document feeding slit 3 to either the slit 4 or slit 7 for discharging the document.

The inside structure of housing 1 in this image reading apparatus is detailed with reference to FIGS. 3 and 4.

Figure 3:
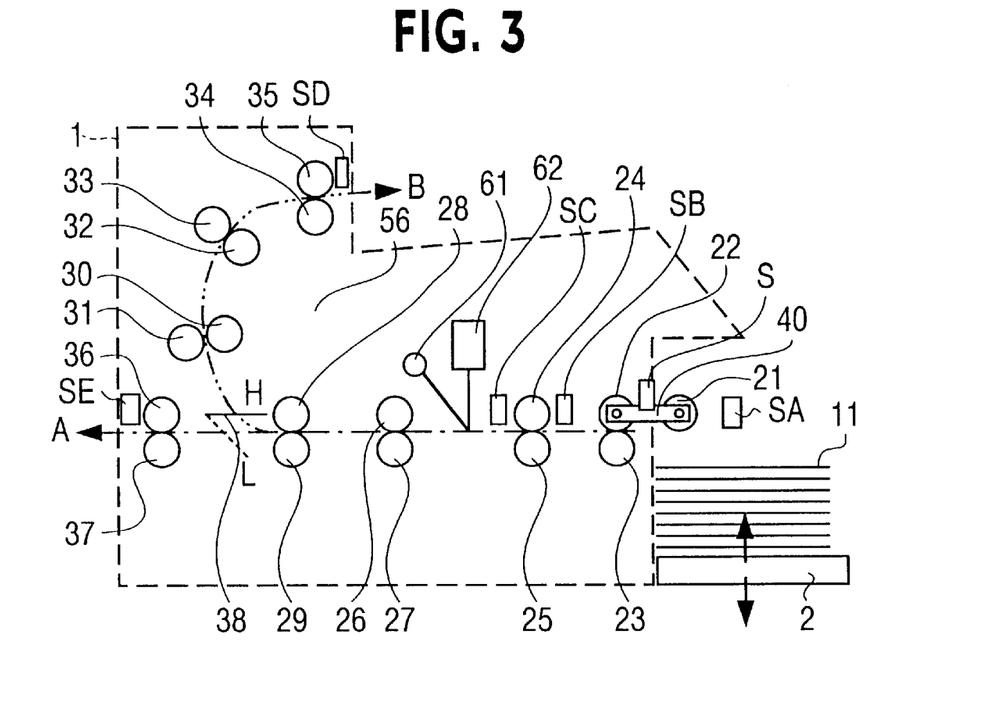
FIG. 3 is a cross sectional view illustrating a rough structure of the image reading apparatus.

In FIG. 3, a pick-up roller 21 spins in a direction of feeding an upper most document of documents 11 stacked on the hopper table 2 into the document feeding slit 3. A document feeding roller 22 spins in a direction of feeding the document 11 from the document feeding slit 3 to the document discharging slit 7. A retarding roller 23 located under the document feeding roller 22 spins in the same direction as the roller 22 to feed the document 11 pinched between the rollers 23 and 22. At the same time, the roller 23 gives frictional force to the lower face of the document 11, thereby to prevent the document 11 from being fed in an overlapped manner. The document feeding means comprises the pick-up roller 21, document feeding roller 22, and retarding roller 23.

Figure 4:
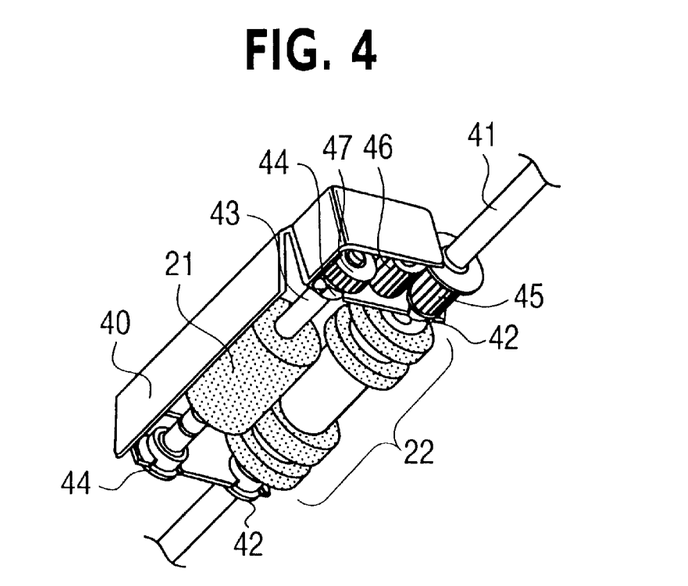
FIG. 4 is a perspective view of an enlarged pick-up roller employed in the image reading apparatus.

As shown in FIG. 4, a rotary shaft 43 of the pick-up roller 21 is mounted rotatably to a roller cover 40 by means of a bearing 44. A rotary shaft 41 of the document feeding roller 22 is mounted rotatably to this cover 40 by means of a bearing 42.

Accordingly, the pick-up roller 21, its shaft 43 and the roller cover 40 can be rotated on the rotary shaft 41.

Figure 5:
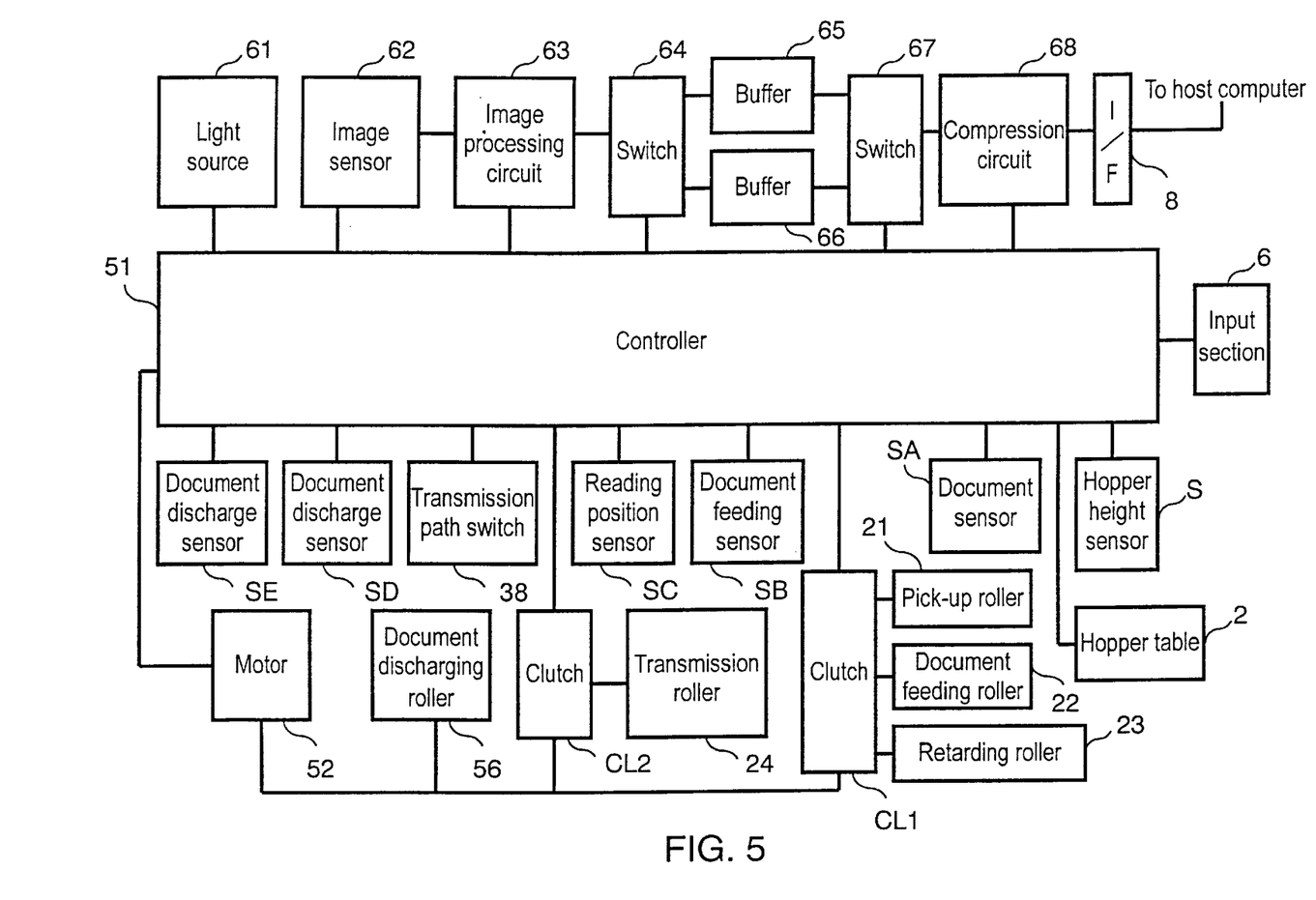
FIG. 5 is a block diagram of the image reading apparatus.

This rotary shaft 41 is coupled to a motor 52 via a clutch CL1 that is shown in FIG. 5. Further, the rotary shaft 43 of the pick-up roller 21 is coupled to the rotary shaft 41 of the document feeding roller 22 via gears 45, 46 and 47. When the motor 52 is driven with the activated clutch CL1, the pick-up roller 21 and the document feeding roller 22 spin in the same direction.

Since the pick-up roller 21 and its shaft 43 rotate on the rotary shaft 41, the pick-up roller 21 is located at a lower position than the document feeding roller 22 when the hopper table 2 is lowered.

Then, the hopper table 2 is raised to push the pick-up roller 21 by the upper most document of the documents 11 up to a height where pick-up roller 21 is approximately on the same height as the document feeding roller 22. The hopper table 2 is stopped at this height, thereby pick-up roller 21 stops being raised, and the documents 11 are fed by driving the motor 52.

Feeding the documents reduces the stacked documents 11 and lowers gradually a height of the upper most document, which accompanies the lowering of pick-up roller 21. A hopper height sensor S senses the position of the roller cover 40 thereby detecting whether the roller 21 is within a given range of heights. When the pick-up roller 21 is detected to have been lowered to a lower position than the given height by the sensor S, the hopper table 2 is raised so that the pick-up roller 21 rises up to the given height.

This mechanism enables the pick-up roller 21 to feed the document 11 securely into a nipping point between the document feeding roller 22 and the retarding roller 23, whereby the document can be fed in a stable manner. A document sensor SA detects the existence of documents 11 stacked on the raised hopper table 2.

A transmission roller 24 transmits the document 11 to the reader. A slave roller 25 is subjected to the rotation of the transmission roller 24. A document feeding sensor SB is disposed on the upstream side of the transmission roller 24, and a reading position sensor SC is disposed on the downstream side thereof.

Document discharging rollers 56 comprise document discharging rollers 26, 28, 30, 32, 34 and 36, and the rollers 56 discharge the document 11, which was already read out, through the document discharging slits 4 or 7. Slave rollers 27, 29, 31, 33, 35 and 37 are subjected to the respective document discharging rollers 26, 28, 30, 32, 34 and 36.

A transmission-path-switch 38 can be switched from a position "H" (shown in a solid line) to a position "L" (shown in a broken line) and vice versa so that a discharging direction is switched from the document discharging slit 7 located on the rear face of the housing 1 to another slit 4 on the front face thereof and vice versa. The discharging direction through the slit 4 is indicated with an arrow mark B, and another direction through the slit 7 is indicated with an arrow mark A.

FIG. 5 is a block diagram depicting a mechanism of how to control the image reading apparatus.

In FIG. 5, a controller 51 controls an entire operation of the image reading apparatus. The motor 52 drives respective rollers that transmit the document 11, i.e. the motor 52 drives the pick-up roller 21, document feeding roller 22 and retarding roller 23 via the clutch CL1, and also drives the transmission roller 24 via the clutch CL2. In addition, the motor 52 drives the document discharging rollers 56 free from the clutches.

When the clutch CL1 is activated and the motor 52 is driven, the pick-up roller 21, document feeding roller 22 and retarding roller 23 are driven, and when the clutch CL1, is inactivated these rollers are released from spinning.

In the same manner, when the clutch CL2, is activated the transmission roller 24 is driven, and when the clutch CL2, is inactivated the roller 24 is free from spinning.

However, the document discharging rollers 56 always spin whenever the motor 52 is driven. The motor 52 employs a stepping motor, the rotational speed thereof is thus readily controlled through the setting of the controller 51.

The hopper position sensor S monitors whether the hopper table 2 is positioned at an appropriate height through sensing the height of pick-up roller 21, which has been described with reference to FIG. 3. The document sensor SA detects whether the document 11 is placed on the hopper table 2. The document feeding sensor SB is disposed on the upstream side of the transmission roller 24. After a given time when this sensor SB detects the leading edge of the document 11, the controller 51 determines that the document 11 is pinched between the transmission roller 24 and its slave roller 25. The reading position sensor SC is disposed on the downstream side of the transmission roller 24. After a given time when the sensor SC detects the leading edge of the document 11, the controller 51 starts reading by using a light source 61 and an image sensor 62 (these two elements will be described later.) The document discharging sensor SD is expected to detect the discharged document 11 from the document discharging slit 4, and a document discharging sensor SE is expected to detect the document 11 discharged from the slit 7.

The controller 51 can switch the transmission path switch 38 from the positions "H" to "L" and vice versa. The switch 38 positioned at "H" leads the document 11 to the document discharging slit 7 (indicated by the arrow mark A), and the switch at "L" leads the document 11 to the slit 4 (arrow mark B.)

An incident light from the light source 61 onto the document 11 is reflected into the image sensor 62, where the light is transformed into electric signals before being fed to an image processing circuit 63. The electric signals undergo image processes including A/D converting process and binarization process in the circuit 63. The resultant image data are written into a buffer 65 or 66. The image data in the buffer 65 or 66 undergo compression process in a compression circuit 68, and are supplied to the outer host computer via the I/F 8.

The buffers 65 and 66 are capable of storing uncompressed data corresponding to a sheet of the document 11. The controller 51 can select the buffer 65 or 66, to which output data from the image processing circuit 63 is stored, and from which the data are read out and fed into the compression circuit 68, by selecting a switch 64 or 67. When the data are written into the buffer 65 or 66, the image processing circuit 63 gives a notice thereof to the controller 51. When the data are read out from the buffer 65 or 66, and are compressed as well as supplied to the host computer, the compression circuit 68 gives a notice thereof to the controller 51. As such, the controller is always informed of the status of both the buffers, namely, which buffer is ready to be written in or read out, and which buffer has been written in or read out.

Figure 13:
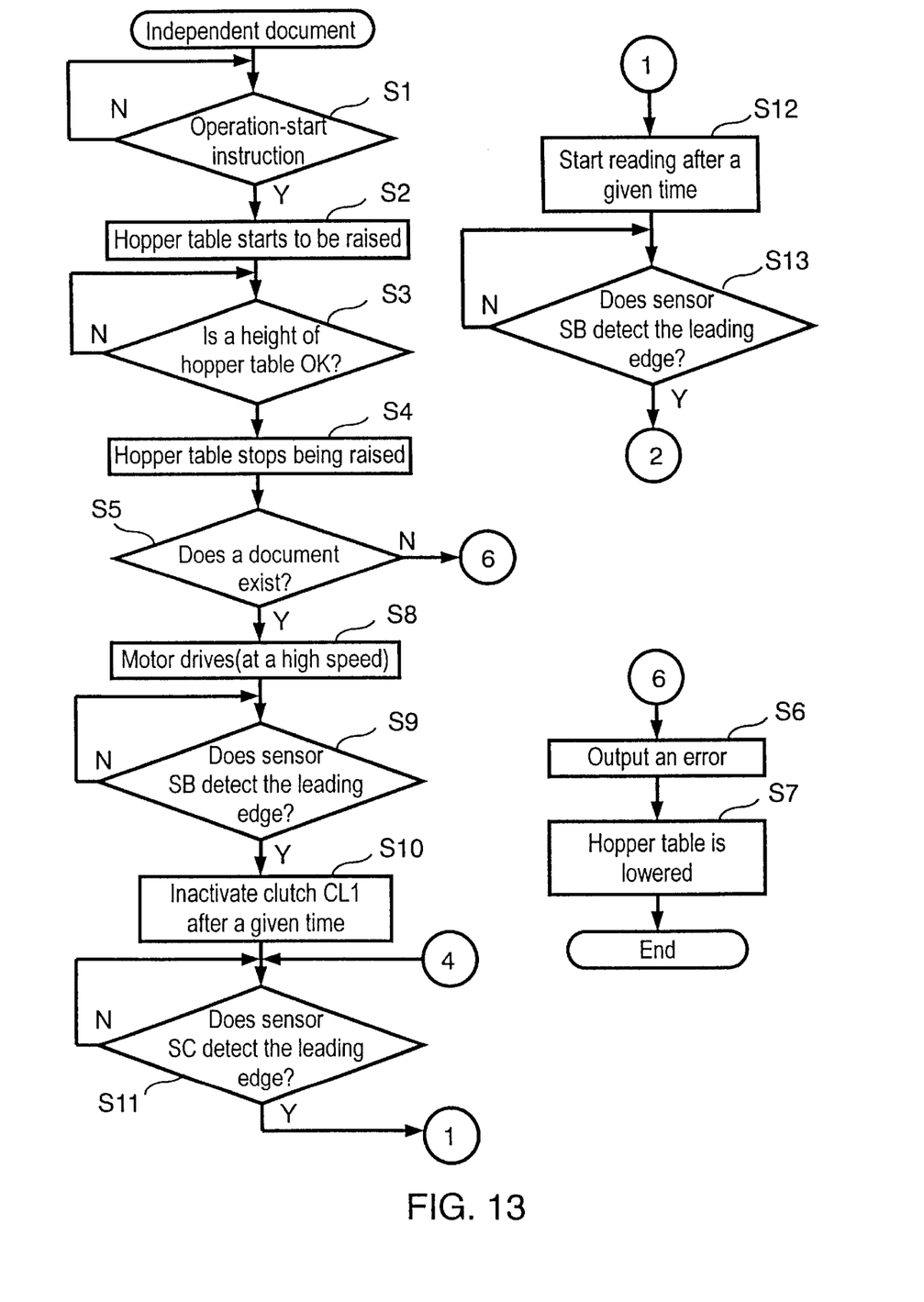
FIG. 13 is a flowchart depicting an operation of handling an independent document.

The operation of the image reading apparatus having the above mentioned construction is described with reference to the flowcharts in FIGS. 13, 14, and 15.

First, when the input section 6 sets that independent documents 11 are to be handled, the controller 51 sets the transmission switch 38 at the "L" side following the setting by the input section 6 (refer to FIG. 6–FIG. 9). The document 11 is thus supposed to be discharged through the slit 4 (along the arrow mark B.)

When the controller 51 firstly receives a command of starting an operation from the host computer (or from the input section 6) [step 1], the hopper table 2 starts to be raised [step 2]. The upper most document of the documents 11 pushes up the pick-up roller 21. (When no document 11 is placed, the table 2 by itself pushes up the pick-up roller 21.) The hopper height sensor S detects that the table reaches to an appropriate height [step 3], then the table stops being raised [step 4]. The document sensor SA checks whether the document 11 exists or not on the hopper table 2 [step 5]. If the document does not exist, the host computer receives an error signal indicating "no document", and a display panel in the input section 6 displays the message of, "no document" [step 6]. Then the hopper table 2 lowers [step 7].

Figure 6:
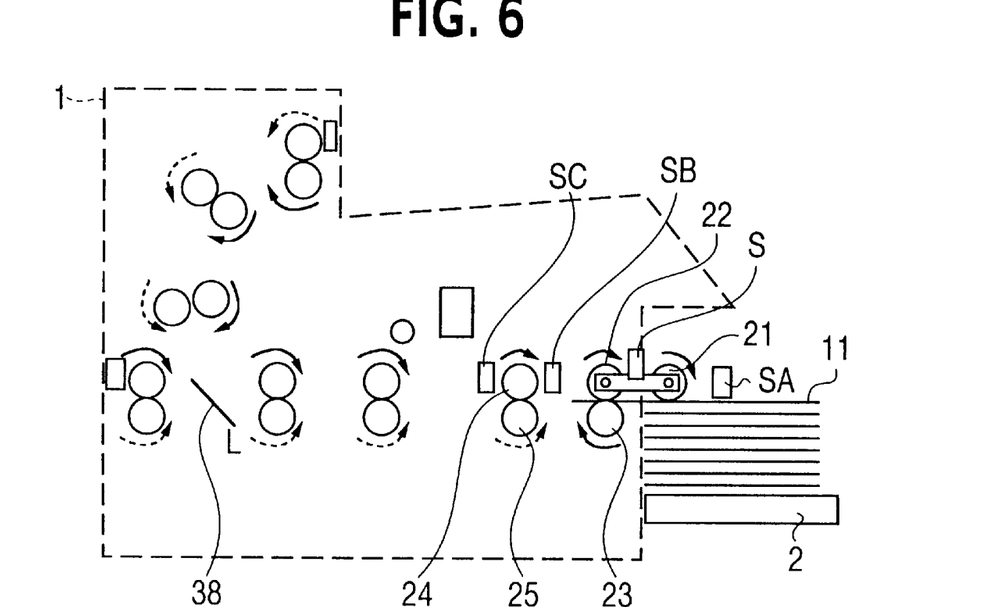
FIG. 6 illustrates an operation of the image reading apparatus.
Figure 7:
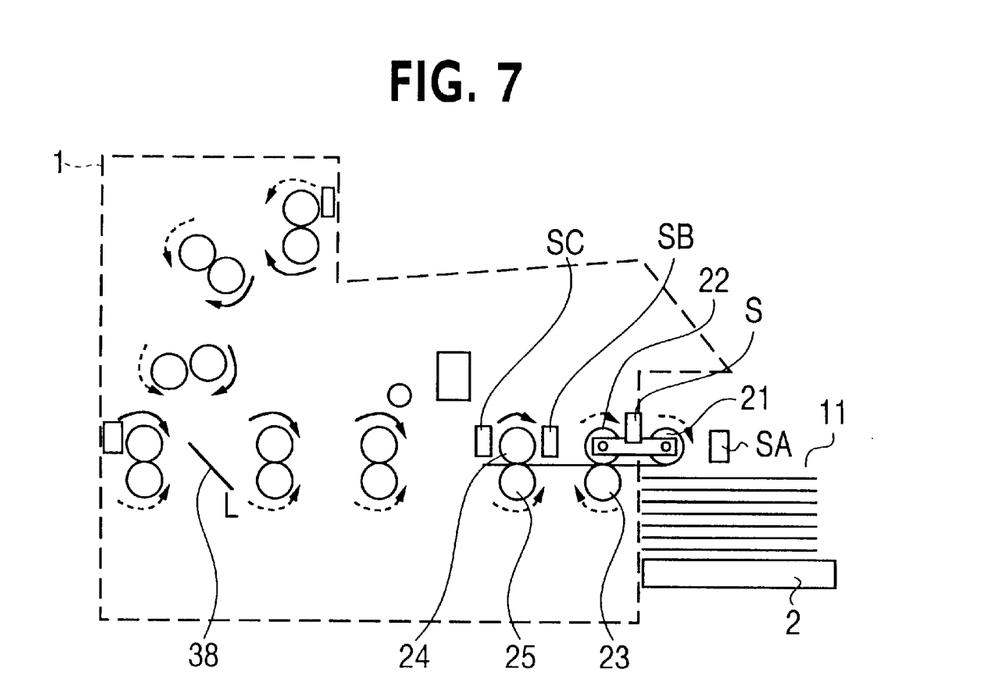
FIG. 7 illustrates an operation of the image reading apparatus.
Figure 8:
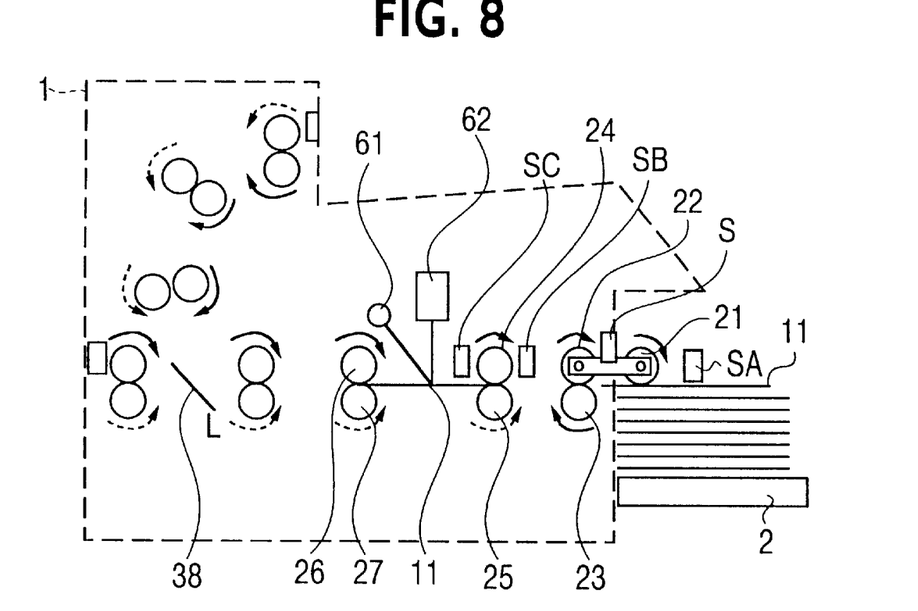
FIG. 8 illustrates an operation of the image reading apparatus.

When the document 11 is placed on the table 2, the controller 51 drives the motor 52 in a high speed mode [step 8]. Then, the pick-up roller 21, document feeding roller 22, retarding roller 23, transmission roller 24 and document discharging rollers 56 spin in unison (suppose that the clutches CL1 and CL2 are activated at an initial condition). The documents 11 on the table 2 start being fed as shown in FIG. 6. The arrow marks in FIG. 6 indicate rotating directions of respective rollers. The solid arrow marks indicate that the rollers are driven directly, and the broken arrow marks indicate that the rollers are slave and subjected to other rollers.

When the document feeding sensor SB detects the leading edge of the document 11 [step 9] after the document feeding is started, the controller 51 inactivates the clutch CL1 in a given time [step 10]. Then, the next document 11 halts to be fed, and the present document 11 is transmitted with the transmission roller 24 and its slave roller 25. The pick-up roller 21, document feeding roller 22 and retarding roller 23 are employed in this transmission. When the reading position sensor SC detects the leading edge of present document 11 [step 11], the light source 61, image sensor 62 start reading after a given time [step 12]. The resultant data are supplied to the host computer via the image processing circuit 63, compression circuit 68. When the document feeding sensor SB detects the ending edge of document 11 [step 13], the next document 11 is fed (refer to FIG. 8).

Figure 14:
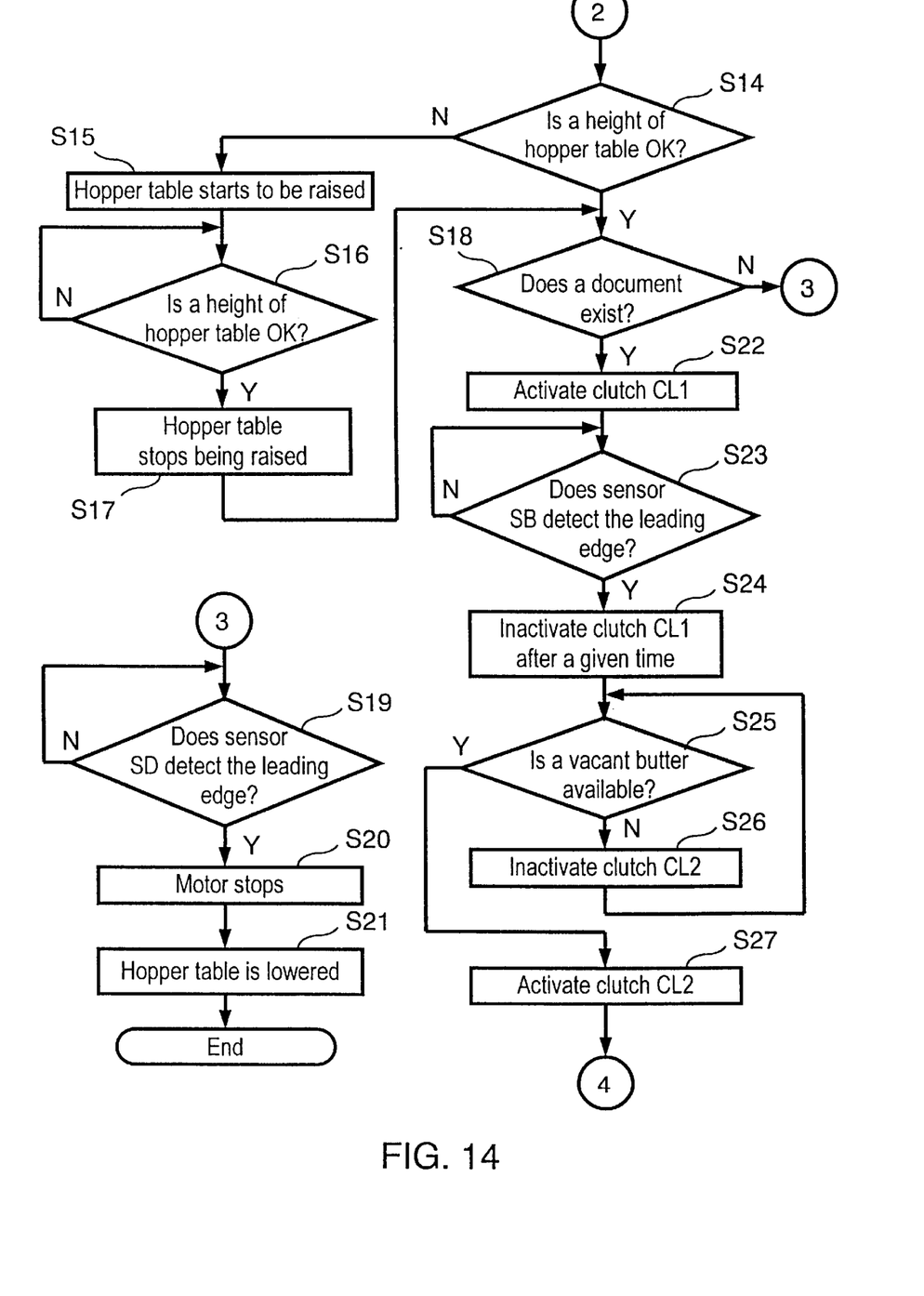
FIG. 14 is a flowchart depicting an operation of handling an independent document.

Next, the operation shown in FIG. 14 is described. The controller 51 checks the height of hopper table 2 with the hopper height sensor S [step 14]. The document sensor SA checks the existence of the next document on the table 2 [step 18], then the clutch CL1 is activated [step 22] to feed the next document. At this time, if the table 2 is not at an appropriate height, the table 2 is raised to the appropriate height [step 15, 16 and 17]. If the next document does not exist on the table 2, the motor 52 is halted [step 20], and the table 2 is lowered [step 21] after the document discharge sensor SD detects the ending edge of the present document 11 [step 19].

Figure 9:
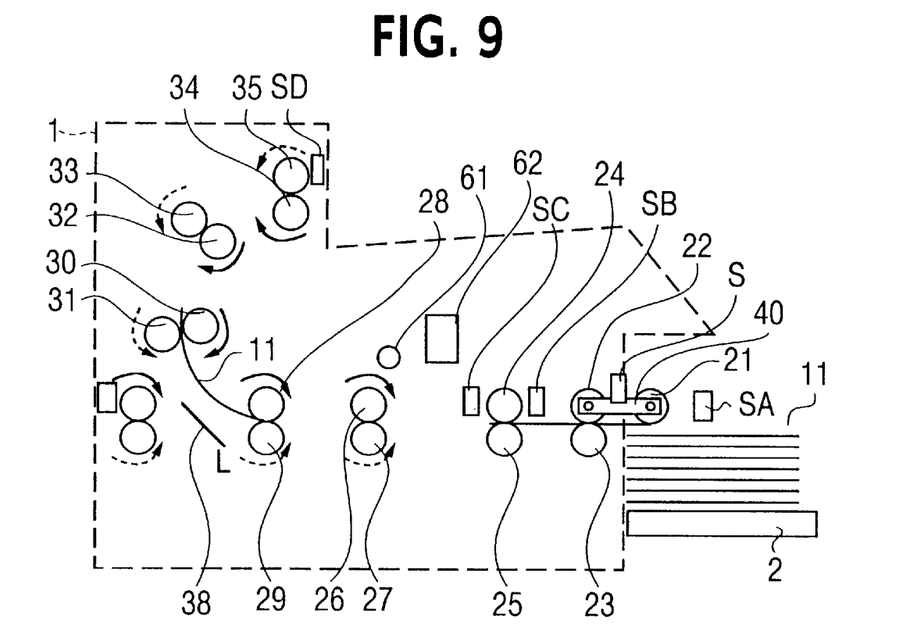
FIG. 9 illustrates an operation of the image reading apparatus.

After the second sheet of document 11 starts to be fed, the document feeding sensor SB detects the leading edge of the second sheet of the document 11 [step 23]. Then, the clutch CL1 is inactivated after a given time [step 24]. The clutch CL2 is kept inactivated until either the buffers 65 or 66 is ready to be written in [step 25 and step 26]. As shown in FIG. 9, the second sheet of document 11 is pinched by the document feeding roller 24 and its slave roller 25 and is halted on stand-by. When either one of the buffers 65 or 66 is ready to be written in, the clutch CL2 is activated and the second sheet of document 11 resumes being fed [step 27], then the process returns to the step 11 shown in FIG. 13. A process time in the compression circuit 68 depends on a content of document 11, and even if the process time has dispersion, a transmission timing of the document can be adjusted using the stand-by status. Therefore, it is not needed for the transmission speed and reading speed of document 11 to be subjected to the maximum processing time in the compression circuit 68.

Next, the case where the input section sets continuous documents to be handled is described with reference to FIG.

15. The controller 51 sets the transmission path switch 38 at the "H" position according to the setting by the input section 6. The document 11 is thus discharged through the slit 7 (the arrow mark A in FIG. 3), and should not be discharged in error to the discharged document stacker 5 disposed at the upper region of the housing 1.

Figure 15:
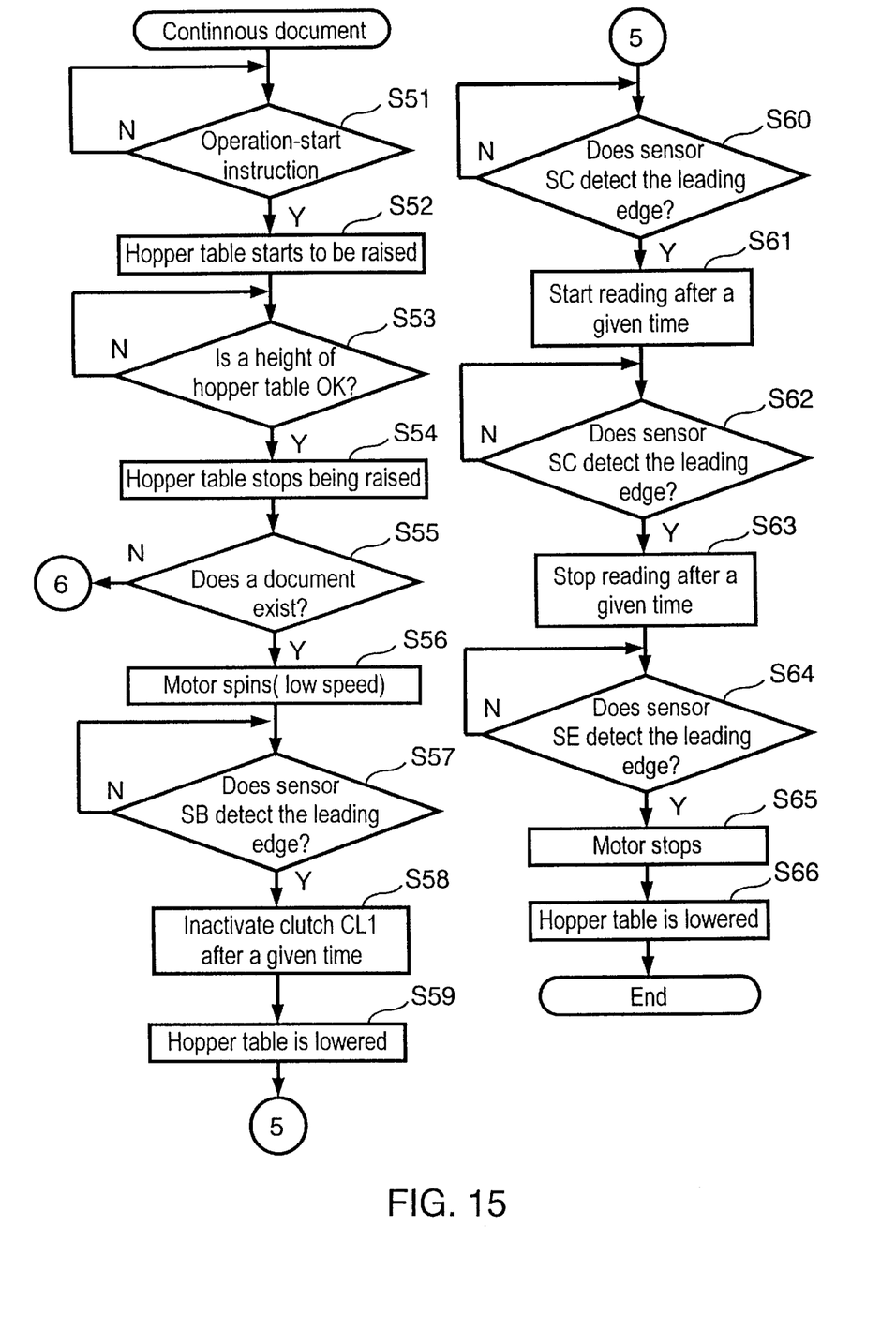
FIG. 15 is a flowchart depicting an operation of handling a continuous document.

On the step 15 of FIG. 15, when the controller 51 receives an operation-start-command from the host computer (an input from the input section 6 is also acceptable), the controller 51 starts raising the hopper table 2 [step 52]. The upper most sheet of the document 11 stacked on the table 2 pushes up the pick-up roller 21 (if the document 11 does not exist on the table 2, the table 2 per se pushes up the roller 21.) The hopper height sensor S detects that the table reaches to an appropriate height [step 53], then the table stops being raised [step 54]. The document sensor SA checks whether the document 11 exists or not on the table 2 [step 55]. If the document does not exist, the host computer receives an error signal indicating "no document", and the display panel in the input section 6 shows the message of "no document" [step 6]. Then the table 2 is lowered [step 7].

Figure 10:
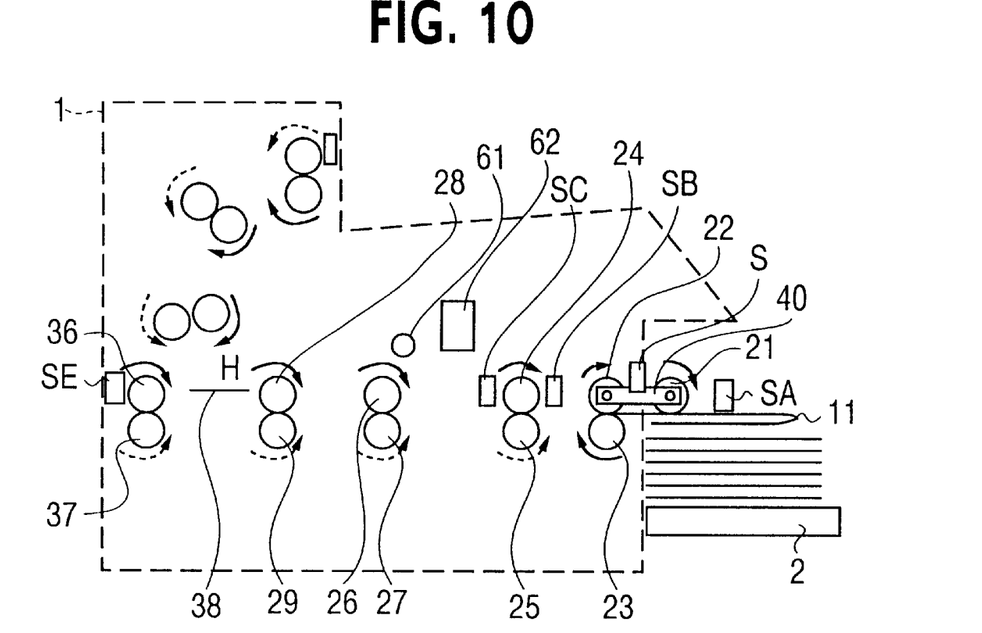
FIG. 10 illustrates an operation of the image reading apparatus.

When the document 11 exists on the table 2, the controller 51 drives the motor 52 in a low speed mode, and starts feeding the document 11 as shown in FIG. 10 [step 56]. The speed in this case is set so that the compression circuit 68 can process the data even if plural sheets are continuously read out. The stand-by status, which is provided to the independent document, is thus not necessary. Since it is difficult to provide the stand-by status during the compressing process in the case of continuous documents, the driving speed of motor 52 should be set at a slower speed than that in the case of handling independent documents.

After the document 11 starts to be fed, the document feeding sensor SB detects the leading edge of the document 11 [step 57]. Then, the controller 51 inactivates the clutch CL1 after a given time [step 58], and the hopper table 2 is lowered [step 59]. The stacked region of the continuous documents 11 on the table 2, particularly its seamed section between the documents, can be thus prevented from being damaged by the pick-up roller 21, document feeding roller 22 and retarding roller 23. The reading position sensor SC detects the leading edge of document 11 [step 60], and after a given time, the document 11 starts to be read out [step 61]. At this time, the controller 51 drives the image sensor 62 at the speed responsive to the slow speed of the motor 52. While reading the documents 11 continuously, the controller 51 controls the switch 64 to switch the write-in operation from the buffer 65 to buffer 66 or vice versa sheet by sheet of documents 11. The compression circuit 68 supplies the image data of each sheet to the host computer. This read-out process is continued until the last end of the continuous documents 11.

Figure 11:
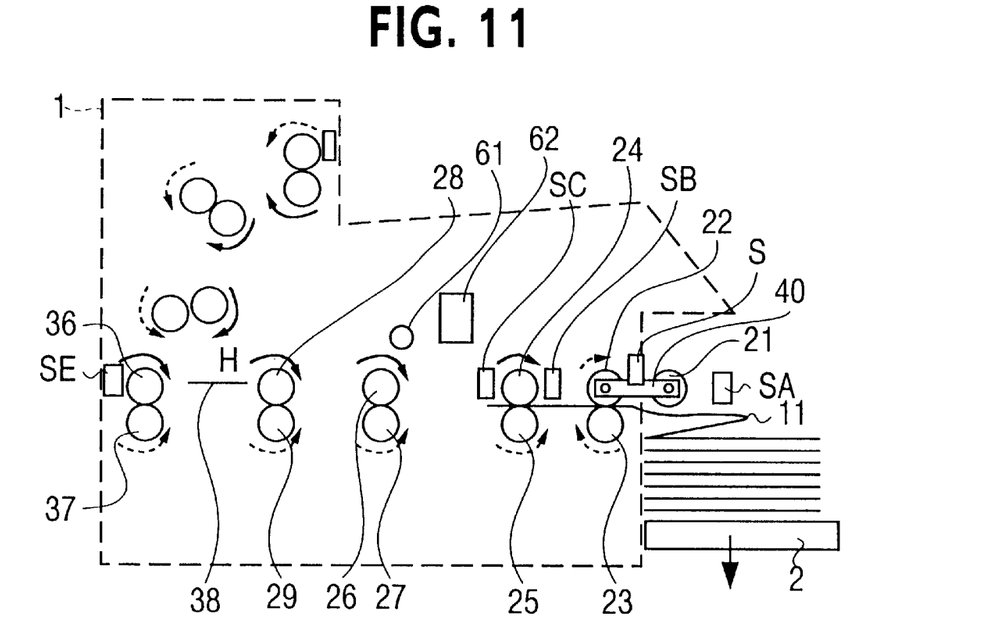
FIG. 11 illustrates an operation of the image reading apparatus.
Figure 12:
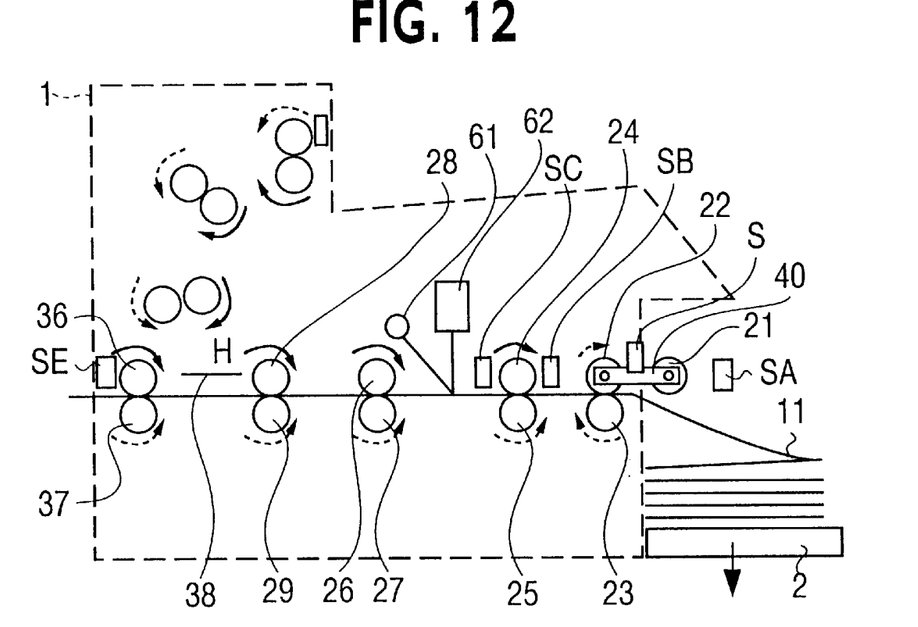
FIG. 12 illustrates an operation of the image reading apparatus.

When the controller 51 detects the ending edge of document 11 through the reading position sensor SC [step 62], the read-out process is halted after a given time [step 63]. When the document discharging sensor SE detects the ending edge [step 64], the controller 51 halts the motor 52 [step 65], and lowers the table 2 to the lowest position [step 66] (refer to FIGS. 11 and 12). On the step 59, if the table 2 is lowered to the lowest point instead of by the predetermined distance, then the controller 51 does not need to lower the table 2 further on step 66.

As such, when the continuous documents are handled, the documents start to be fed under the condition that the hopper table 2 is raised, then the table 2 is lowered. This mechanism prevents the continuous documents from being damaged.

According to the present invention, in the case of handling the independent document, a following document is halted just behind the reader until a preceding document undergoes read-out process and output process. This mechanism minimizes the interval of sequential feeding of each sheet of the documents, whereby read-out of the documents can be processed in a high speed. In the case of handling the continuous documents, since it is difficult to provide a stand-by status responsive to the compression process during the transmission, the driving speed of motor 52 is set at a lower speed than that of handling the independent documents so that the read-out can be processed. As a result, one image reading apparatus can handle both of the independent documents and the continuous documents.

It is to be understood that the invention is not to be limited to the exact construction described above, but that various changes and modifications may be made without departing from the sprit of the invention as set forth in the subjoined claims that follow.

What is claimed is:

1. An image reading apparatus comprising:

a table on which a document is to be placed;

transmission means for transmitting the document;

reading means for reading the document; and control means for controlling said table, said transmission means and said reading means;

wherein said control means is operable to transmit the document stacked on said table with said transmission means, read the document with said reading means, and switch process speeds of said transmission means and said reading means in response to a switching of a type of the document on said table, and to lower said table after a predetermined length ofthe document is transferred when the type of document is a continuous document.

2. The image reading apparatus as defined in claim 1 further comprising:

image data process means for processing image data read by said reading means;

wherein in a case of reading a continuous document, the process speeds of said transmission means and said reading means are subjected to a process speed of said image data process means.

3. The image reading apparatus as defined in claim 1 further comprising:

table moving means for moving said table up and down;

wherein said control means is operable to raise said table on which the document is placed before transmitting the document with said transmission means, and lower said table after a predetermined length of the document is transferred in response to a type of the document.

4. The image reading apparatus as defined in claim 1 wherein said transmission means includes document feeding means for taking a leading edge of the document into said apparatus, and in a case of handling a continuous document, said document feeding means stops operation after a predetermined length of the document is transmitted into said apparatus.

5. The image reading apparatus as defined in claim 1, wherein said transmission means has different transmission paths for an independent document and a continuous document.

6. An image reading apparatus comprising:

a table on which a document is to be placed;

transmission means for transmitting a document;

reading means for reading information from the document transmitted by said transmission means;

input means for setting the kind of the document and for providing an output indicative of the kind of document;

control means for switching the process speeds of said transmission means and reading means in response to the output of said input means, transmitting the document stacked on said table with said transmission means, reading the document with said reading means, and lowering said table after a predetermined length of the document is transferred when the type of document is a continuous document.

7. An image reading apparatus comprising:

a table on which a document is to be placed;

transmission means for transmitting a document;

reading means for reading information from the document transmitted by said transmission means;

setting means for setting the kind of the document as an independent document or a continuous document and for providing an output indicative of the kind of document;

control means for switching the process speeds of said transmission means and reading means in response to the output of said setting means, transmitting the document stacked on said table with said transmission means, reading the document with said reading means, and lowering said table after a predetermined length of the document is transferred when the type of the document is a continuous document.

8. An image reading apparatus comprising:

a table on which a document is to be placed;

transmission means for transmitting the document;

reading means for reading the document;

table moving means for moving said table up and down; and control means for controlling said table, said transmission means, said reading means and said table moving means;

wherein said control means is operable to transmit the document stacked on said table with said transmission means, read the document with said reading means and switch process speeds of said transmission means and said reading means in response to a switching of a type of the document on said table, and to lower said table after a predetermined length of the document is transferred when the type of the document is a continuous document.

* * * * *